_United States Patent Office_

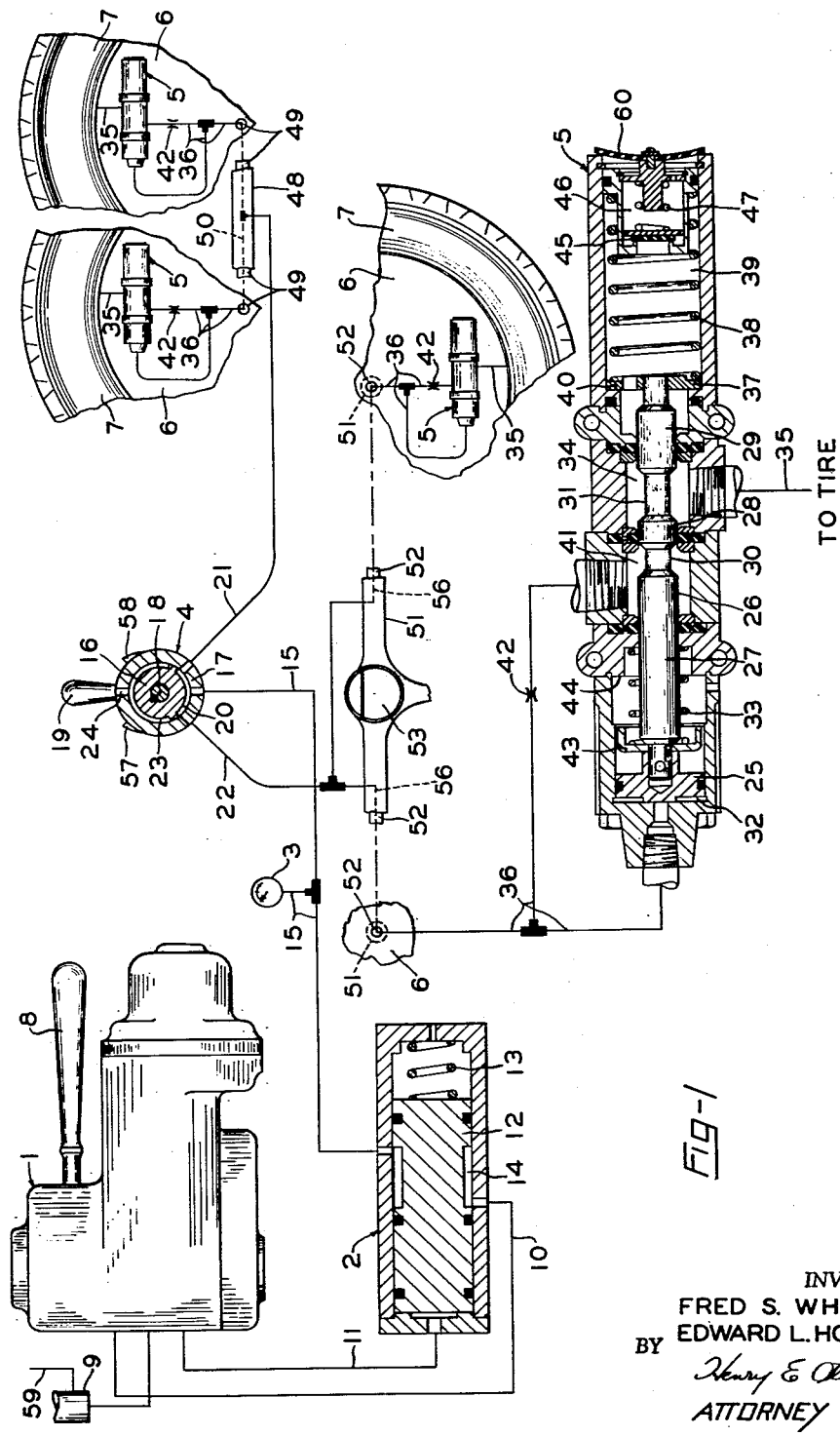

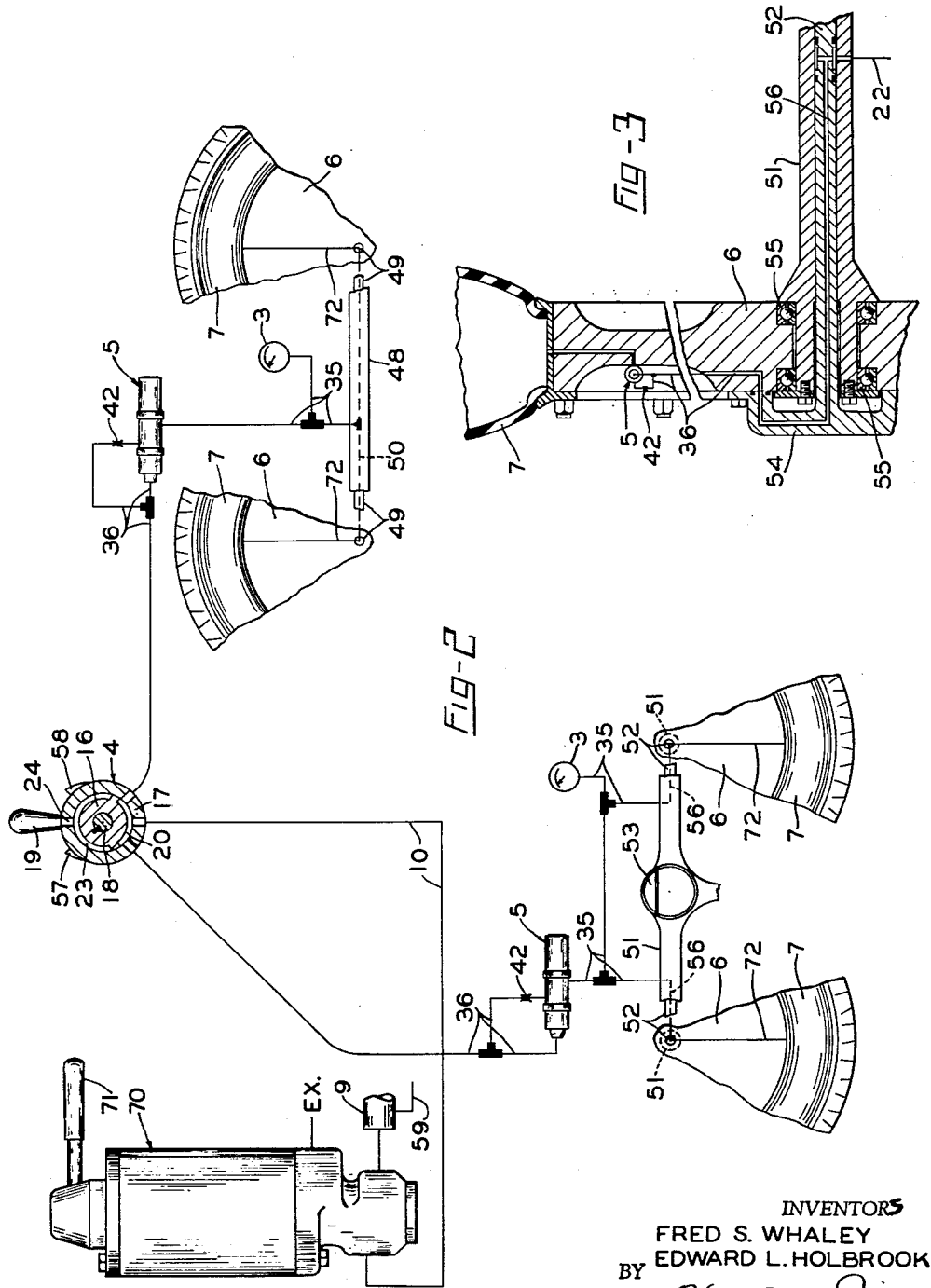

2,989,989
Patented June 27, 1961

2,989,989
VALVE FOR TIRE INFLATION CONTROL SYSTEM
Fred S. Whaley, Northbrook, Ill., and Edward L. Holbrook, East McKeesport, Pa., assignors to Westinghouse Air Brake Company, Wilmerding, Pa., a corporation of Pennsylvania
Filed Mar. 17, 1959, Ser. No. 799,944
5 Claims. (Cl. 137—625.25)

This invention relates to valves of the type employed in pneumatic control systems to enable remote control of the pressure of fluid in one or more receiving members, such as tires of a vehicle, and more particularly, relates to a valve device which is controllable through a single fluid pressure line to effect gradual variations of the pressure in the receiving member or members and to effect a rapid reduction of the pressure in the member or members in bypass of the normal gradual pressure control arrangement.

The principal object of this invention is to provide an improved control valve device for use in a pneumatic control system wherein an operator, by adjusting the pressure in a single control pipe or passage into different ranges of pressure can effect operation of the control valve device so as to cause fluid under pressure to be bottled-up in an inflatable member or members, or effect operation of the control valve device so as to cause a slow charging or release of pressure in said member or members to a desired value within a predetermined normal operating range of pressures corresponding to the pressure of fluid established in the control pipe, or effect operation of the control valve device so as to cause a rapid reduction of the pressure in the member or members, and a consequent deflation thereof in the case of vehicle tires, to a chosen minimum pressure greater than atmospheric pressure.

Another object of this invention is to provide a control valve device of the type described in the foregoing object which is adapted to be carried on a vehicle wheel and which is always actuated to a lap position under normal service conditions so that the problem of leakage through a rotary seal or coupling from a stationary axle to the rotating wheel is obviated.

In accordance with these objects the improved control valve device comprises a tubular valve casing containing a spool valve having a fluid pressure responsive means, illustrated as a piston, at one end adapted to be subject in a control chamber at one side of the piston to a control fluid pressure delivered thereto through a single passage, for example a passage located in the stationary axle of a vehicle. The spool valve is normally biased as by a spring to a so-called lap position interrupting the connection between a supply chamber, which is connected to the control chamber through a restricted passage, and a delivery chamber which is connected through suitable conduits to the member or members to be charged and/or inflated. The biasing spring is of such value that so long as the control fluid pressure is below a certain low pressure, the valve is biased to its lap position and when the control fluid pressure is increased to a value above the certain low pressure and below a certain high pressure the spool valve is shifted to a supply position establishing communication between the supply chamber and the delivery chamber, in which position variations of the pressure in the members may be effected. An additional spring-biased stop, in the form of a caged spring, is effective to limit the movement of the spool valve beyond the supply position so long as the control fluid pressure does not exceed the certain high pressure. When the control fluid pressure is increased to a value above the certain high pressure, the additional spring-biased stop yields to permit further movement of the spool valve to a third position in which the communication between the supply and delivery chambers is interrupted and communication between the delivery chamber and an exhaust chamber is established. Opening out of the exhaust chamber is a spring-biased check valve which enables the rapid venting of pressure from the delivery chamber and the connected members to atmosphere until the pressure reaches a certain low value.

When the control valve device is employed to control inflation of a plurality of tires on the vehicle, one inflation control valve device and its associated conduit are preferably carried on each wheel so that when these conduits are vented, as will normally be the case except when tire pressure is to be changed, no leakage of fluid under pressure can occur from the tire via the wheel-carrying axle and the axle housing through which pressure fluid must be conveyed to the tire.

Other objects and advantages will become apparent from the following more detailed description of the invention and from the accompanying drawings, wherein:

FIG. 1 is a diagrammatic view of a control valve device constructed according to the preferred embodiment of the invention, and associated controls which may be employed therewith for controlling pressures of fluid in tires on a vehicle;

FIG. 2 is a diagrammatic view of another form of tire inflation control system in which the novel control valve device may be employed; and FIG. 3 is a fragmentary section view of an axle, axle housing and wheel of the vehicle showing the manner in which pressure fluid may be supplied to the tire inflation control valve device shown in detail in FIG. 1 and in outline in FIG. 2 and carried by a wheel mounted on one shaft of a split driving axle.

*Description—FIG. 1*

The tire inflation control system, in which the novel control valve device comprising the invention is utilized, comprises an operator's control valve device 1, a cut-off valve device 2, a pressure gage 3, and a selector valve device 4, each located in the cab of a vehicle, and a plurality of tire inflation control valve devices 5 constructed in accordance with the invention and each mounted on a respective wheel 6 of the vehicle for controlling the pressure of fluid in a corresponding inflatable tire 7 mounted on such wheel.

The operator's control valve device 1 may be of any well-known type, such as disclosed in FIG. 2 of U.S. Patent No. 2,173,940, granted on September 26, 1939 to E. E. Hewitt. This valve device 1 comprises, briefly, self-lapping valve means (not shown) responsive to horizontal arcuate movement of a handle 8 from a normal position into an application zone to supply fluid under pressure from a reservoir 9 to a control pipe 10 (corresponding to pipe 302 of said patent) for providing in said control pipe fluid at a selectable pressure corresponding to the setting of said handle in said zone; and responsive to movement of said handle toward or to said normal position to provide fluid at a corresponding reduced pressure in said control pipe. This valve device 1 also comprises other valve means (not shown) responsive to depression of the handle 8, while in the application zone, to supply fluid at the pressure of fluid in the reservoir 9 to an actuating pipe 11 (corresponding to pipe 94 of said patent); said handle normally being biased to an elevated position for causing said other valve means to vent pipe 11.

The cut-off valve device 2 may comprise a spool valve 12 sealingly reciprocable in a bore in a sectionalized casing and subject opposingly to pressure of fluid in pipe 11 and to pressure of a helical bias spring 13 in an atmospheric chamber. When pipe 11 is vented, spring 13 biases valve 12 to a normal position, in which it is shown, and in which an elongated annular cavity 14 in said valve connects control pipe 10 to a pipe 15 having branches leading to the gage 3 and to device 4.

The selector valve device 4 may, for sake of illustration, be of the cock type comprising a plug valve 16 rotatably disposed in a casing 17 and operably connected to a shaft 18 secured to a handle 19. When the handle 19 is in an upright or intermediate position, in which it is shown, a plug valve cavity 20 will be so disposed as to concurrently connect pipe 15 with two pipes 21, 22; and all of said pipes will be sealed off from another plug valve cavity 23 that is constantly open to a vent port 24 through the casing.

Each tire inflation control valve device 5 may comprise a piston 25 reciprocable in a bore in a sectionalized casing and coaxially connected to a spool-type valve 26. Valve 26 has three axially spaced lands 27, 28, 29 adapted to sealingly slide within and relative to annular resilient seals carried by the casing; and said valve has two elongated annular grooves 30, 31 disposed adjacent opposite ends of the intermediate land 28.

When pressure of fluid in a pressure chamber 32 at the side of piston 25 remote from valve 26 is less than a predetermined low value, such as about 10 p.s.i., said piston and hence said valve will be biased to a lap position, in which they are shown, by a light helical spring 33 in an atmospheric chamber. With valve 26 in this position, each of the lands 27, 28, 29 sealingly engages its corresponding resilient seal for bottling up fluid under pressure in a delivery chamber 34 and thereby in the corresponding tire 7, which is constantly connected to said delivery chamber by way of a delivery conduit 35.

When chamber 32 is charged by way of a supply conduit 36 with fluid at any pressure within a predetermined operating range defined between said predetermined low value and a predetermined high value, such as about 85 p.s.i., the piston 25 and valve 26 will shift against resistance of spring 33 to a slow charge and release position, in which valve land 29 abuts a spring retaining washer 37 but does not effect compression of a relatively heavy helical spring 38 that is disposed in an exhaust chamber 39 and bears against the end wall of the casing and biases said washer into contact with a shoulder 40 in the casing so as normally to cage said heavy spring. With valve 26 in this position, land 29 continues to engage its resilient seal, and groove 30 connects the delivery chamber 34 with a supply chamber 41 preferably connected via a restriction 42 to a branch of conduit 36.

When the fluid pressure supplied via conduit 36 to chamber 32 exceeds said predetermined high value, piston 25 and hence valve 26 will be shifted against the combined resistance of springs 33, 38 to a quick release position, which may be defined by contact of a piston follower 43 with a shoulder 44 in the casing. With valve 26 in quick release position, land 27 engages the resilient seal between chambers 41, 34, and groove 31 connects delivery chamber 34 to exhaust chamber 39. A retaining valve 45 of the check-valve type preferably is disposed in an atmospheric chamber 46 in the casing of device 5 and biased to a seated position by a helical spring 47 in said chamber so as normally to cut off the exhaust chamber 39 from the atmosphere; said retaining valve, by virtue of the bias effect of spring 47, serving to prevent the pressure in the corresponding tire 7 from being reduced below a chosen minimum value when the valve 26 is shifted to quick release position. This chosen minimum value corresponds to a predetermined minimum tire pressure which will enable the tires to have adequate traction for negotiating swampy terrain.

The pressures of fluid provided in the respective conduits 36 for controlling operation of the devices 5 associated with the respective wheels 6 are controlled from the pipes 21, 22. For sake of illustration, pipe 21 is shown leading to an axle housing 48 in which is non-rotatably disposed a one-piece non-driving axle 49 on which two of the wheels 6 are rotatably mounted. Pipe 21 is constantly connected to the conduits 36 on these two wheels by way of suitable radial ports through the middle of the axle housing and axle that communicate with a passage 50 extending through and toward the ends of the axle, and radial ports in the axle connecting said passage with the respective conduits 36. O-ring type seals (not shown), comparable to those shown in FIG. 3, straddle the radial ports in the axle 49 for preventing leakage of pressure fluid from passage 50 along said axle.

Pipe 22, on the other hand, is shown as connected to a port in an axle housing 51 in which is rotatably disposed a driving axle comprising two shafts 52 that are driven by a differential 53 and carry two other wheels 6. As shown in FIG. 3, each axle shaft 52 may be of the truck type having a flanged end 54 which is bolted to the side of a wheel 6 supported on wheel bearings 55 mounted about the axle housing 51. Pressure fluid is conveyed from pipe 22 via the port in the axle housing 51 and an elongated annular cavity and a radial port in the axle shaft 52 to a passage 56 which extends axially in the axle shaft 52 to the flanged end 54 and then generally radially through the latter to the bolting face of said end where it communicates with the conduit 36 associated with the corresponding wheel 6; it being noted that O-ring type seals are carried by the axle shaft 52 adjacent each end of said annular cavity to prevent leakage of pressure fluid along said shaft, and an O-ring seal is disposed in said bolting face in encirclement of passage 56 for preventing leakage of pressure fluid along said bolting face.

*Operation—FIG. 1*

Assume initially that handle 8 of operator's control valve device 1 is in its normal position and is not being depressed; and that handle 19 of selector valve device 4 is in its intermediate or upright position. Under this condition, all components will be in the respective positions in which they are shown in this figure of the drawing, and fluid under pressure will be bottled up in all of the tires 7.

To increase or decrease the pressures of fluid in these tires to a selected value within the predetermined operating range (illustratively assumed as 10 to 85 p.s.i.), the handle 8 is moved arcuately to provide fluid at said selected value of pressure in the control pipe 10. Assuming that the pressure provided in the control pipe 10 exceeds that then existing in the tires 7, fluid under pressure will flow from pipe 10 via cut-off valve cavity 14 to pipe 15 and thence via selector valve cavity 20 to pipes 21, 22, whence it will flow via previously-described communication to the conduits 36 on the respective wheels. Pressure fluid thus supplied to each conduit 36 will shift the piston 25 and valve 26 of the corresponding tire inflation control valve device 5 to their previously defined slow charge and release position for permitting fluid under pressure to flow via conduit 36, restriction 42, supply chamber 41, valve groove 30, delivery chamber 34, and conduit 35 to the corresponding tire 7 for charging the latter to equality with the selected value of control pipe pressure. If, however, the pressure provided in the control pipe 10 should be less than that then existing in the tires 7, it will be apparent that tire pressure will be reduced to the selected value of control pipe pressure by reverse flow through the communication just described and at the rate controlled by restriction 42.

The selector valve handle 19 may be moved counterclockwise into contact with a casing lug 57 for so rotating valve 16 as to cause its exhaust cavity 23 to connect pipe 22 to vent port 24 while maintaining pipes 15, 21 connected via valve cavity 20; and said handle may be moved clockwise into contact with a casing lug 58 for so rotating valve 16 as to cause exhaust cavity 23 to connect pipe 21 to vent port 24 while maintaining pipes 15, 22 connected via valve cavity 20. Hence, if it is desired to vary the pressure in the tires 7 of the wheels carried by the axle 49 but not vary the tire pressure on the wheels carried by the axle shafts 52, the handle 19 should be rocked into contact with lug 57 before control valve handle 8 is moved arcuately from its normal position; and in similar fashion, by initially rocking handle 19 into contact with lug 58, the tire pressure of only the wheels associated with the axle shafts 52 will be varied upon subsequent arcuate movement of the handle 8. The selector valve device 4 is therefore provided in those cases, where both concurrent and selective control of pressures in the tires is desired; and said device may be eliminated if it is desired to control pressures in all tires concurrently.

In either event, while the handle 8 is in the application zone, it may be depressed for charging pipe 11 and thereby shifting cut-off valve 12 against resistance of spring 13 to a cut-off position, in which pipes 10 and 15 are disconnected, for permitting gage 3 to accurately record the tire pressure existing in all or certain of the tires 7 (according to where selector valve handle 19 is then positioned), unaffected by the pressure head in the control pipe 10. The cut-off valve device 2 is especially desirable when the tire inflation control system is to be employed on heavy-duty construction equipment or military vehicles having many tires of high volume, for this will permit periodic checks on tire pressure during the relatively long period of time required to inflate these tires to the high pressure used when traveling on hard-surface highways. It should here be noted that the restrictions 42 are preferably provided to permit the use of a relatively small engine-driven compressor (not shown) for charging the reservoir 9 via a pipe 59. The respective flow capacities of each of these restrictions 42 is preferably equal; and the aggregate of such flow capacities preferably is substantially equal to the charging rate of the compressor to permit the tires 7 to be charged as rapidly as possible, yet prevent pressure in the reservoir 9 from being reduced when all of the tires are being inflated simultaneously, so that reservoir pressure will be maintained substantially constant and thus assure that sufficient pressure will always be available in the reservoir to enable actuation of the inflation control valves 26 to their quick release position, in the manner now to be described.

Assume now that the vehicle is leaving a hard-surface highway and entering onto swampy terrain. To quickly deflate all or certain of the tires 7 (according to the preselected position of selector valve handle 19), and thereby improve tire traction, the handle 8 is moved arcuately to an extreme position in the application zone so as to provide in control pipe 10 fluid at a very high pressure, such as the pressure of fluid in the reservoir 9, which exceeds the aforementioned predetermined operating range of tire pressures. During this arcuate movement of handle 8, it should not be depressed, so that pipe 11 will be maintained vented and thereby permit fluid at this very high pressure to flow via cut-off valve cavity 14 and pipe 15 to those conduits 36 which are then connected to pipe 15 by way of the selector valve 16; whereupon the piston 25 and valve 26 associated with each such charged conduit 36 will be promptly shifted to its previously-defined quick release position against the combined resistance of springs 33, 38 for permitting fluid under pressure to flow from its respective tire 7 by way of valve groove 31 to exhaust chamber 39 and thence to atmosphere past the retaining valve 45 and a deflectable rubber dirt guard 60 which prevents entry of dirt and moisture into the device 5. Tire pressure will thus be reduced rapidly, in bypass of restriction 42, to the chosen minimum value of pressure desired to be retained in the tire, as determined by the chosen bias effect of spring 47.

It is to be noted that a separate valve device 5 and conduit 36 is preferably provided on each wheel so that when the respective conduits 36 are vented and the valves 26 move to lap position for bottling up pressure fluid in the corresponding tires 7, the passages 50 and 54 in the axle 49 and axle shafts 52 will be vented; and hence there will be no possibility of leakage of pressure fluid from the tires by way of said passages.

Accordingly, after the handle 8 has been moved into the application zone for shifting all or some of the valves 26 to slow charge and release position, said handle should be returned to normal position for venting control pipe 10 and thereby causing the valves 26 to be shifted to lap position, as soon as possible after the operator has verified (by actuation of the cut-off valve device 2 to obtain an accurate reading on gage 3 as above described) that the particular tires 7 have been inflated or deflated to the desired pressure.

*Description and operation—FIG. 2*

Since the tire inflation control system of FIG. 2 is somewhat similar to that shown in FIG. 1, like reference numerals have been used to identify like parts.

In the system shown in FIG. 2, the cut-off valve device 2 is eliminated, thereby permitting the use of an operator's control valve device 70 comprising merely a self-lapping valve means; the control pipe 10 is connected directly to the selector valve device 4 (or to the conduits 36 if the device 4 is not employed), it being noted that pipes 21, 22 are eliminated and that conduits 36 are connected directly to device 4; two tire inflation control valve devices 5 are mounted on the vehicle frame (rather than one on each wheel 6) for controlling tire pressures on all wheels 6 carried by the axle 49 and by the axle shaft 52, respectively; the conduits 35 (rather than the pipes 21 or 22) are connected to the passages 50 and 54 in the axle housings 48, 51, respectively, and a conduit 72 leads from ends of said passages 50 or 54, as the case may be, to the tires 7 on each wheel; and two pressure gages 3, one for measuring tire pressure on the wheels 6 mounted on axle 49 and one for measuring tire pressure on the wheels mounted on axle shafts 52, are provided in the vehicle cab and connected to branches of the respective conduits 35.

The operator's control valve device 70 may be of the type disclosed in U.S. Patent 2,324,910, granted on July 20, 1943 to E. S. Cook and assigned to the assignee of the present invention. This valve device 70 comprises, briefly, self-lapping valve means (not shown) operable by arcuate movement of a handle 71 into an application zone to provide from reservoir 9 in the control pipe 10 fluid at a pressure corresponding to the setting of said handle in said zone, in essentially the same manner as the self-lapping valve means of device 1.

This system is suitable for use on vehicles with relatively few tires and/or tires of relatively small volume where the gage-isolation feature afforded by the cut-off valve device 2 of FIG. 1 is not required and the leakage-preventing arrangement of FIG. 1 is not desired in order to reduce cost.

In operation, tire pressures in the wheels 6 mounted on the axle 49 or the axle shafts 52 may be concurrently or selectively varied (according to the preselected position of selector valve handle 19) in response to variations in pressure of fluid provided in the single control pipe 10 as controlled by the setting of handle 71, as will be apparent from previous description; however, when the control pipe 10 and hence conduits 36 are vented and the respective valves 26 of devices 5 are in lap position, fluid under pressure will be bottled up in the conduits 35, axle passages 50 or 54, conduits 72 and tires 7. Since the gages 3 are connected to the respective conduits 35, and thereby to the associated tires 7, accurate readings of tire pressures will be obtained when the valves 26 of devices 5 are in lap position; and the operator may therefore periodically read these gages to assure that tire pressures have not dropped below the desired value due to leakage from the passages 50 or 54 or other causes.

The tires may be inflated or deflated at a slow rate by charging the control pipe 10 with fluid at a selectable pressure within the normal operating range of tire pressures and corresponding to the actual tire pressure desired; and the tires may be rapidly deflated by charging the control pipe 10 with fluid at a very high pressure (beyond said normal operating range), in the same manner as described in connection with FIG. 1.

It is to be understood that the specific structures of the various component valve devices and the arrangements for conveying pressure fluid through the axle 49 or axle shafts 52 from the pipes 21, 22 (FIG. 1) or the conduits 35 (FIG. 2) to the devices 5 (FIG. 1) or the conduits 72 (FIG. 2) are merely illustrative of the manner in which the control valve device comprising the invention may be employed. For instance, it will be apparent that instead of using a device 1 of the combined self-lapping valve and on-off valve type controlled by a single handle 8 and a cut-off valve device 2 indirectly controlled by depression of said handle, two separate valve devices may be used, such as the device 70 for controlling control pipe pressure and a manually operable cock device for controlling connection of the control pipe 10 with pipe 15.

Also, more than two wheels may be mounted on each non-driving axle 49 or on each shaft 52 of a split driving axle; and all axles may be non-driving axles or split driving axles or non-split sprocket-driven driving axles. It will also be apparent that the novel control valve device herein disclosed and claimed may be employed for controlling selective or concurrent inflation of inflatable members other than tires; for example, inflatable dunnage members employed on freight cars, in which case a much narrower range of normal operating pressures would be employed, and the pipes 21 and 22 would of course be eliminated and conduits 36 directly connected to the device 4, and the conduits 35 would be connected to the dunnage members.

Having now described the invention, what we claim as new and desire to secure by Letters Patent is:

1. A control valve device for controlling pressure of fluid in a receiving member in response to variations in a control fluid pressure, said control valve device comprising casing means having therein a control chamber, a delivery chamber, an exhaust chamber, a light spring, a normally caged heavy spring, and a reciprocable valve member subject to a control fluid pressure acting in said control chamber in opposition to the pressure of said light spring and also to the pressure of said heavy spring when the latter is uncaged; said valve member being biased to a lap position by said light spring responsively to establishment in said control chamber of a control fluid pressure below a certain low value to bottle up fluid under pressure in the delivery chamber and moved responsively to any selected degree of control fluid pressure in said control chamber between said certain low value and a predetermined high value to another position in which said light spring is compressed and said valve member operatively contacts but does not uncage said heavy spring and in which said valve member establishes communication via which the control fluid pressure flows to the delivery chamber for providing therein a pressure corresponding to that of the control fluid pressure established in the control chamber; said valve member being further moved responsively to a control fluid pressure in said control chamber exceeding said predetermined high value to a quick release position in which said heavy spring is operatively uncaged by and yieldingly opposes movement of said valve member, said valve member in said quick release position establishing communication for release of fluid under pressure from the delivery chamber to said exhaust chamber; and a retaining valve means interposed in the exhaust chamber for preventing fluid under pressure therein from being reduced below a chosen minimum value when the said valve means is in said quick release position.

2. A control valve device for controlling the pressure of fluid in a pneumatically chargeable member in response to variations in a control fluid pressure, said control valve device comprising casing means having therein a control chamber, a delivery chamber, an exhaust chamber, a light spring, a normally caged heavy spring, and a reciprocable valve element controlling communication via which fluid at the control fluid pressure flows to the delivery chamber and via which fluid under pressure flows from the delivery chamber to said exhaust chamber, said valve element being subject to the pressure of the control fluid acting in said control chamber in opposition to the pressure of said light spring and also to the pressure of said heavy spring when the latter is uncaged; said valve element being biased to a lap position by said light spring responsively to establishment in said control chamber of a control fluid pressure below a certain value to bottle up fluid under pressure in the delivery chamber; said valve element being moved responsively to the establishment in said control chamber of any selected degree of control fluid pressure between said certain low value and a predetermined high value to an intermediate position in which said light spring is compressed and said valve element operatively contacts but does not uncage said heavy spring, said valve element while in said intermediate position establishing communication via which the control fluid pressure flows to and from the delivery chamber for providing therein fluid at a pressure corresponding to that of the control fluid; said valve element being further responsive to establishment in said control chamber of a control fluid pressure exceeding said predetermined high value to a release position in which said heavy spring is operatively uncaged by said valve element and in which said valve element establishes communication via which fluid under pressure in released from the delivery chamber to said exhaust chamber.

3. A control valve device for controlling the pressure of fluid in a pneumatically chargeable member, said control valve device comprising, in combination, casing means having therein a control chamber chargeable with fluid at a selected pressure in a relatively wide range, a supply chamber having a restricted communication with said control chamber, a delivery chamber connectable to the member in which fluid pressure is to be controlled, and an exhaust chamber having communication with the atmosphere; valve means reciprocable within the casing means; fluid pressure responsive means subject to the pressure of fluid established in said control chamber to operate said valve means from a lap position, in which the valve means cuts off communication between the supply chamber and the delivery chamber as well as between the delivery chamber and the exhaust chamber, successively to two positions, in the first of which positions the valve means establishes communication between the supply chamber and the delivery chamber while maintaining cut off the connection between the delivery chamber and the exhaust chamber and in the second of which positions the valve means cuts off the connection between the supply chamber and the delivery chamber while opening communication between the delivery chamber and the exhaust chamber; and two spring means associated with said valve means in such a manner than one spring means acts to oppose movement of the valve means to the said first position and that both of said spring means act to oppose movement of the valve means to said second position in response to the pressure of fluid established in said control chamber, said one spring means being effective to restore said valve means to its said lap position upon venting of fluid under pressure from said control chamber.

4. A control valve device as claimed in claim 3, further characterized by a check valve device in the communication between the said exhaust chamber and atmosphere, said check valve operating to permit exhaust flow of fluid under pressure from said exhaust chamber to atmosphere only so long as the fluid pressure in said exhaust chamber exceeds a certain uniform low pressure.

5. A control valve device comprising, in combination, a casing means providing a control chamber chargeable with fluid at a selectable pressure, a delivery chamber connectable to a member in which pressure is to be controlled, and an exhaust chamber, a light spring, a heavy spring, valve means reciprocable within the casing means and subject to control chamber pressure always acting in opposition to the pressure of said light spring and at certain times also acting in opposition to the pressure of said heavy spring, means normally caging said heavy spring to limit the extent of its expansion toward said valve means, said valve means upon venting of the control chamber being biased by said light spring to a lap position on which it cuts off the delivery chamber from the control chamber and exhaust chamber, said valve means being responsive to charging of said control chamber to a selected pressure within a predetermined range of superatmospheric pressures to shift against resistance of said light spring to another position in which said valve means operatively contacts but does not uncage said heavy spring and in which it establishes a fluid pressure connection between the control chamber and delivery chamber to provide fluid at said selected pressure in the delivery chamber, said valve means being responsive to charging of said control chamber to a pressure beyond said range to shift against the combined resistance of both of said springs to a release position in which it disconnects the control chamber from the delivery chamber and connects the latter to the exhaust chamber.

References Cited in the file of this patent

FOREIGN PATENTS 576,040     Great Britain _____ Mar. 15, 1946